United States Patent [19]

Stephens

[11] 4,034,445
[45] July 12, 1977

[54] MOLDED TOP STOP AND APPARATUS AND METHOD OF MANUFACTURE

[75] Inventor: Milton Lewis Stephens, Meadville, Pa.

[73] Assignee: Textron, Inc., Providence, R.I.

[21] Appl. No.: 599,516

[22] Filed: July 28, 1975

[51] Int. Cl.² ........................................ A44B 19/36
[52] U.S. Cl. ..................................... 24/205.11 F
[58] Field of Search ............ 24/205.11 R, 205.11 F

[56] References Cited

U.S. PATENT DOCUMENTS

| 1,785,740 | 12/1930 | Legat | 24/205.11 R |
| 1,916,390 | 7/1933 | Rutherford | 24/205.11 R |
| 1,960,202 | 5/1934 | Carr | 24/205.11 R |
| 2,832,119 | 4/1958 | Neitlich | 24/205.11 F |
| 3,862,474 | 1/1975 | Ebata | 24/205.11 F |
| 3,869,765 | 3/1975 | Fukuroi | 24/205.11 F |
| 3,872,552 | 3/1975 | Hofius | 24/205.11 F |
| 3,906,594 | 9/1975 | Takahashi | 24/205.11 F |

FOREIGN PATENT DOCUMENTS

| 688,264 | 6/1964 | Canada | 24/205.11 R |
| 2,039,191 | 2/1971 | Germany | 24/205.11 F |

Primary Examiner—Bernard A. Gelak

[57] ABSTRACT

Molded top stops for a slide fastener have inner edges extending substantially in alignment with the inner edges of the interlocking elements and have bottom edges extending at acute angles upward and away from the interlocking elements. Further, during the molding of the top stops, extra interlocking element sections and the like are trimmed by trimming edge features on a horn tip cooperating with an anvil portion of a die.

5 Claims, 11 Drawing Figures

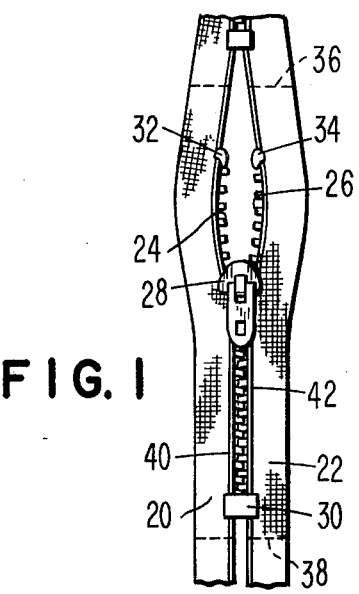
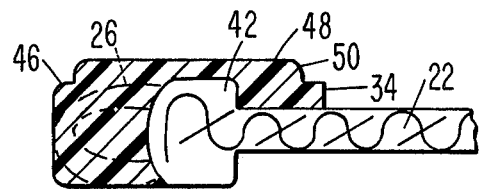
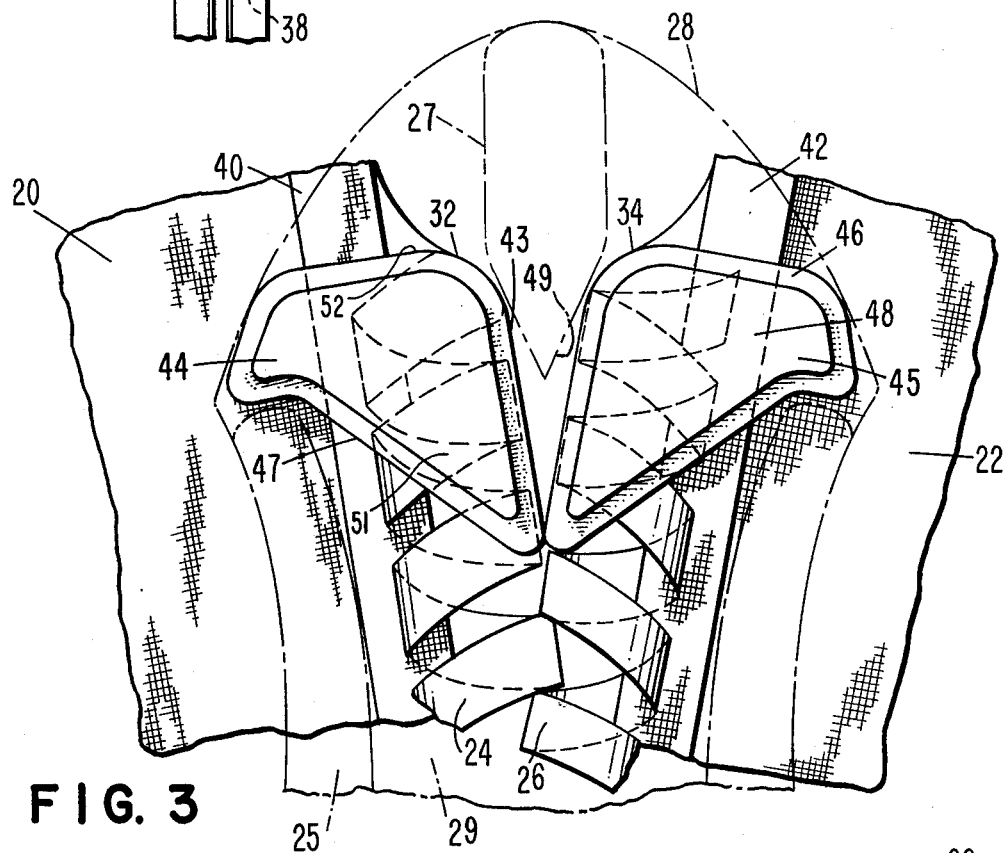
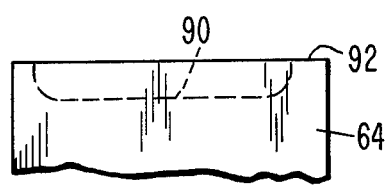
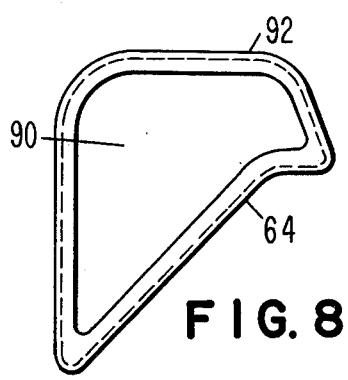

MOLDED TOP STOP AND APPARATUS AND METHOD OF MANUFACTURE

BACKGROUND OF THE INVENTION

1. Field of the Invention

The invention relates to slide fasteners, and particularly to molded top stops for slide fasteners.

2. Description of the Prior Art

The prior art, as exemplified in U.S. Pat. No. 2,680,087, U.S. Pat. No. 2,832,119, U.S. Pat. No. 3,001,904, U.S. Pat. No. 3,190,779, U.S. Pat. No. 3,309,746, U.S. Pat. No. 3,340,594, U.S. Pat. No. 3,353,233, U.S. Pat. No. 3,353,256, U.S. Pat. No. 3,482,292, U.S. Pat. No. 3,488,239, U.S. Pat. No. 3,510,379, U.S. Pat. No. 3,672,008, U.S. Pat. No. 3,686,719, U.S. Pat. No. 3,735,469, U.S. Pat. No. 3,748,709, U.S. Pat. No. 3,775,815, U.S. Pat. No. 3,800,394, U.S. Pat. No. 3,804,577, U.S. Pat. No. 3,813,459, and U.S. Pat. No. 3,862,474 and British Pat. Nos. 1,162,932 and 1,314,365, contains a number of slide fasteners having molded top stops as well as methods and apparatus for forming the top stops. In the prior art extra interlocking elements above the top stop were generally trimmed in a separate step after the forming of the top stop; such extra step of trimming requiring separate machinery and handling.

SUMMARY OF THE INVENTION

The invention is summarized in a top stop for a slide fastener which has a pair of carrier tapes, interlocking fastening elements secured to inner edges of the tapes, and a slider with flanges and a divider forming a Y-shaped channel for opening and closing the interlocking fastening elements, the top stop including a body molded around the exposed head portion of at least one end fastening element on a respective one of the tapes and molded to one side of a portion of the one tape, the body having a flange engaging portion extending over the one tape in the path of movement of one of the flanges and having a first substantially straight edge extending substantially in alignment with the inner edges of the head portions of the fastening elements on the one tape, and the body further having a second edge extending from the bottom end of the body at an acute angle away from the first edge to the flange engaging portion such as to allow the bottom end of the body to extend into the V-shaped channel when the slide fastener is closed.

An object of the invention is to construct a top stop which is less costly and had improved appearance, durability and strength.

Another object of the invention is to eliminate separate coil taper weld and trim operations.

It is also an object of the invention to utilize a trim edge feature on one of the members forming the top stop in order to produce a smooth burr-free, non-hangup top stop with very little splay.

One feature of the invention is that a punch is shaped to produce a rounded top portion with a depression extending completely around the body portion to prevent sharp edges.

Other ojects, advantages and features of the invention will become apparent from the following description of the preferred embodiment taken in conjunction with the accompanying drawings.

BRIEF DESCRIPTION OF THE DRAWINGS

FIG. 1 is a plan view of a slide fastener made in accordance with the invention.

FIG. 2 is a cross-section view of a top stop of the slide fastener in FIG. 1.

FIG. 3 is an enlarged view of the top stops of the slide fastener of FIG. 1 when the slide fastener is in a closed position.

FIG. 7 is an elevation view of a top portion of a punch of the apparatus of FIG. 4.

FIG. 8 is a plan view of the punch of FIG. 7.

DESCRIPTION OF THE PREFERRED EMBODIMENT

Figure 4:
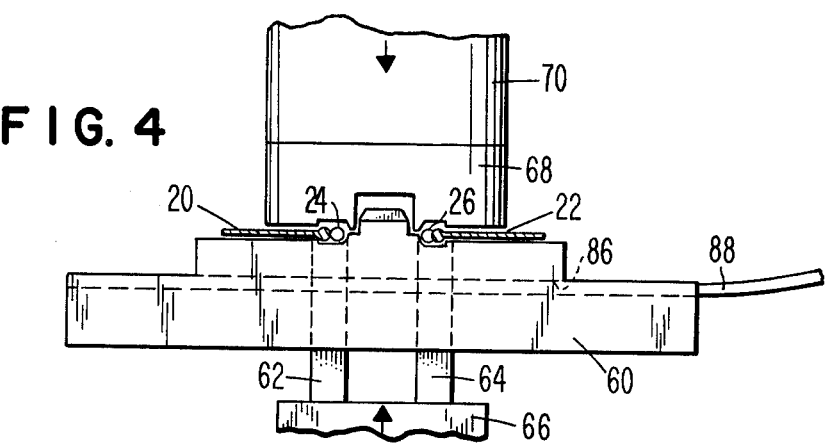
FIG. 4 is an elevation view of an apparatus for forming the top stops on the slide fastener of FIG. 1.

As illustrated in FIG. 1, a slide fastener made in accordance with the invention includes a pair of carrier tapes 20 and 22 with respective pluralities of interlocking fastening elements 24 and 26 atached or secured to inner edges of the tapes 20 and 22. A slider 28 having flanges 25, FIG. 3, and a divider 27 forming a Y-shaped channel 29 is slidable over the fastening elements 24 and 26 for opening and closing the fastening elements. A bottom stop 30 secures the inner edges of the tapes 20 and 22 and bottom fastening elements 24 and 26 together at one end of the slide fastener, while top stops 32 and 34 are molded on the inner edges of the respective tapes 20 and 22 and on the top fastening elements of the elements 24 and 26 at the other end of the fastener. Conveniently the slide fastener may be in a continuous chain of slide fasteners which can be cut along dashed lines 36 and 38 to separate the slide fastener from the other slide fasteners in the chain.

Beaded edges 40 and 42 may be provided on the inner edges of the tapes 20 and 22 to more securely support the fastening elements 24 and 26. As shown in FIGS. 2 and 3, the fastening elements 24 and 26 are preferably formed in a continuous filament such as meanders or spiral coils of continuous filament formed in such a manner to produce interlocking fastening elements as is well known in the art. However, the fastening elements 24 ad 26 may be molded metal or plastic elements including continuous trains of molded elements joined by filaments.

The top stops 32 and 34 are bodies of material such as relatively rigid thermoplastic and the like, which are molded from punched blocks of the material to the front side of the tapes 20 and 22 and around the exposed head portion of at least one of each of the end fastening elements 24 and 26 at the top of the slide fastener. Respective flange engaging portions 44 and 45 of the top stops 32 and 34 extend over portions of the tapes 20 and 22 adjacent their inner edges in the path of movement of slider flanges 25. Substantially straight inner edges 43 of the top stops 32 and 34 extend substantially in alignment with inner edges of the head portions of the respective fastening elements 24 and 26. Substantially straight bottom edges 47 of the top stops 32 and 34 extend from intersections with the inner edges 43 upward and outward at an acute angle, such as about 45°, from the inner edges over the fastening elements 24 and 26 and inner edges of the tapes 20 and 22 to the flange engaging portions 44 and 45. The inner edges 43 and bottom edges 47 thus form acute-angled bottom portions 51 such as to allow the bottom ends of the top stops to extend into the Y-shaped channel 29 to engage the bottom ends of the top stops 32 and 34 together when the slide fastener is closed. Top edges 52 of the top stops 32 and 34 extend perpendicular to the inner edges of the tapes 20 and 22 and to the inner edges 43 of the top stops; thus the top edges 52 with the respective inner edges 43 and bottom edges 47 form generally right triangular configurations with the flange engaging portions 44 and 45 protruding therefrom.

The divider 27 of the slider 28 has a tapered bottom end 49 spaced above the top end of the flanges 25. The top ends of the stops 32 and 34 at the inner edges 43 are spaced relative to the flange engaging portions such that the top ends of the inner edges 43 engage the tapered bottom end 49 of the slider divider 27 when the slide fastener is closed. A rabbet or depression 46 is formed completely around the front and raised edge of the body of the top stops 32 and 34 leaving a central raised portion 48. The edges 50 of the raised portion 48 are rounded to present a smooth exposed surface.

Having the bodies of the top stops 32 and 34 molded around the exposed head portions of at least one of the top fastening elements 24 and 26 as well as to the portions of the tapes adjacent to such one elements due to the particular shape of the top stops 32 and 34, i.e., the inclined edges 47 with the inner edges 43 in alignment with the inner edges of the fastening elements, produces substantial areas of attachment to the fastening elements and thus great strength of attachment of the top stops to the fastener. The top stops are substantially hidden and unobtrusive due to their bottom ends extending into the Y-shaped channel 29 of the slider 28 when the slider is closed. The bottoms of the inner edges 43 engaging within the channel 29 together with the top portions of the edges 43 engaging the divider 27 results in substantially no inward crosswise forces on the tapes 20 and 22 and elements 24 and 26 (i.e. forces transverse to the longitudinal dimension of the tapes) solely due to the engagement of the flanges 25 with the top stops 32 and 34; thus the top stops 32 and 34 are relatively less likely to be torn from the fastener by repeated use. Further it is noted that the attachment of the top stops both around the top fastening elements and to the portions of the tapes 20 and 22 adjacent the top fastening elements substantially reinforces the strength of attachment to the tapes of the fastening elements adjacent the top fastening elements where such elements are formed from a continuous filament or are trains of elements joined by filaments; thus the slide fastener is less likely to fail from crosswise forces applied to the tapes at or above the top stops.

By having the top stops formed with the rabbets 46 leaving the raised central portion 48, a central portion 48 is produced which supplies the necessary height to insure the prevention of removal of the slider 28 from the fastener. The rabbets 46 result in gradual or stepped increase in height of the top stops 32 and 34 over the tapes 20 and 22 resulting in relatively less obtrusive edges which can snag on clothing or other articles. Further the rabbets 46 and rounded edges 50 result in less expensive slide fasteners since they can be easily formed during the molding of the top stops as more fully described hereafter.

Figure 5:
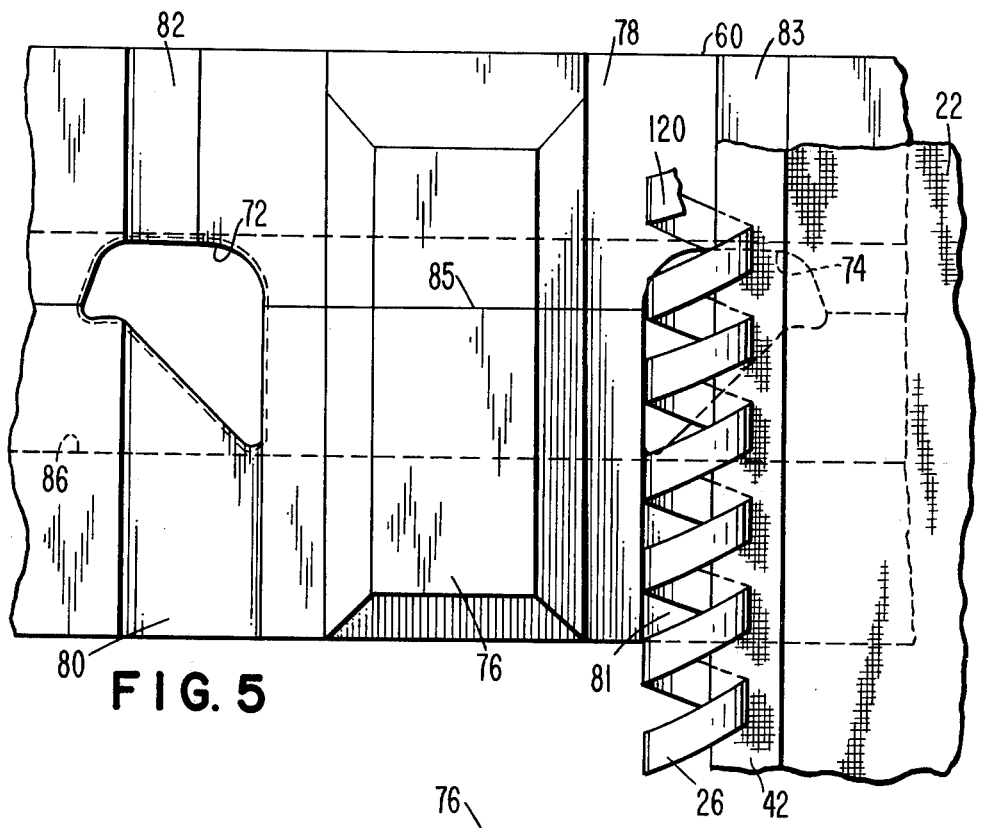
FIG. 5 is a top plan view of an anvil and die member of the apparatus of FIG. 4.
Figure 6:
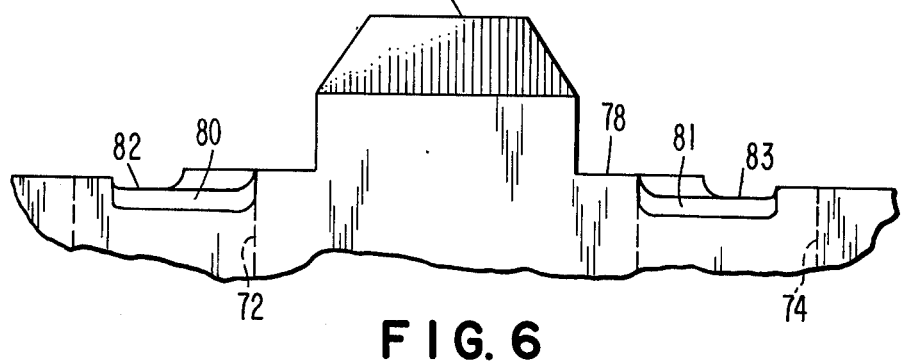
FIG. 6 is an elevation view of a broken away portion the anvil and die member of FIG. 5.

An apparatus for forming the top stops 32 and 34 on the slide fastener is shown in FIG. 4 and includes a die and anvil member 60, a pair of punches 62 and 64 mounted on a ram device 66, and a horn tip 68 mounted on the end of an engaging and ultrasonic vibration mechanism 70. The die and anvil member 60, as shown in FIGS. 5 and 6, has a pair of vertical die openings 72 and 74 with a cross-section shape forming the outer edges of the top stops 32 and 34. A chain separator portion 76 extends above the upper surface 78 of the member 60 and has a suitable shape for easy insertion into the opening between the upper portion of the stringers of the slide fastener chain when they are opened by the slider 28 being positioned towards the bottom stop 30 as shown in FIG. 1. A pair of of channels 80 and 81 in the surface 78 corresponding in width to the width of the fastening element 24 and beaded edge 40 and the fastening element 26 and beaded edge 42, respectively, extend parallel from the respective die openings 72 and 74 to one edge of the member 60. Channels 82 and 83 in the surface 78 correspond in width to the width of the respective beaded edges 40 and 42 and extend in alignment with the outer portion of the channels 80 and 81 from the respective die openings 72 and 74 to the opposite edge of the member 60. As shown in FIGS. 4 and 5 the member 60 has a horizontal passageway 86 for directing a strip of thermoplastic material 88 through the die member 60 with the die openings 72 and 74 intersecting the passageway 86. For convenience in forming the die and anvil members 60, it can be formed in two halves joined at split line 85.

As shown in FIGS. 7 and 8, the punch 64 has a cross section mating with the cross section of the die opening 74 and is designed to cooperate with the upper edges of the passageway 86 at the opening 74 to punch out a similarly shaped block of material from the strip 88. The upper end of the punch 64 has a cavity 90 formed by a raised edge 92 completely around the upper periphery of the punch 64. The cavity 90 has a depth with rounded bottom corners designed to produce the desired height and shape of the central portion 48, FIG. 2, of the top stop 34.

The punch 62 is similar to the punch 64 but is shaped to mate with the die opening 72.

As shown by the dashed lines bordering the opening 72 in FIG. 5 and bordering the punch 64 in FIG. 8, the punches and die may be suitably case hardened.

Figure 9:
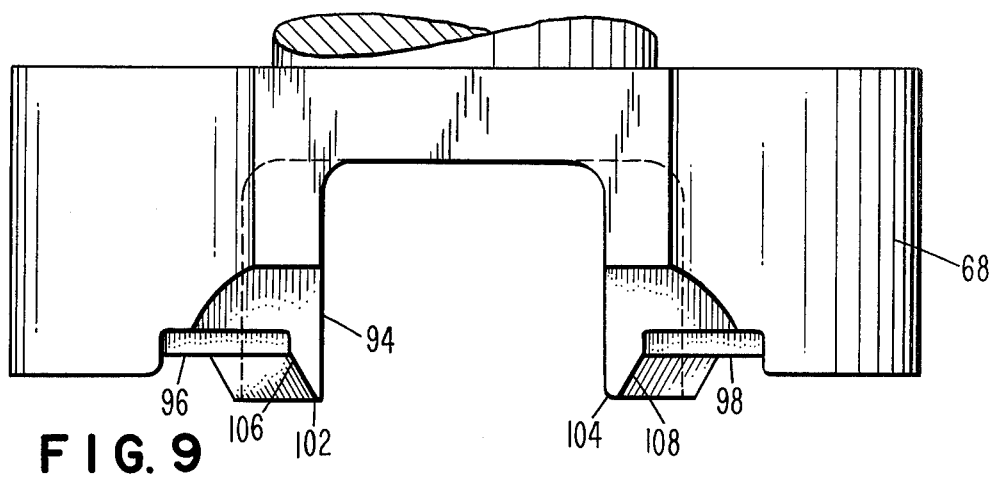
FIG. 9 is an elevation view of a horn tip of the apparatus of FIG. 4.
Figure 10:
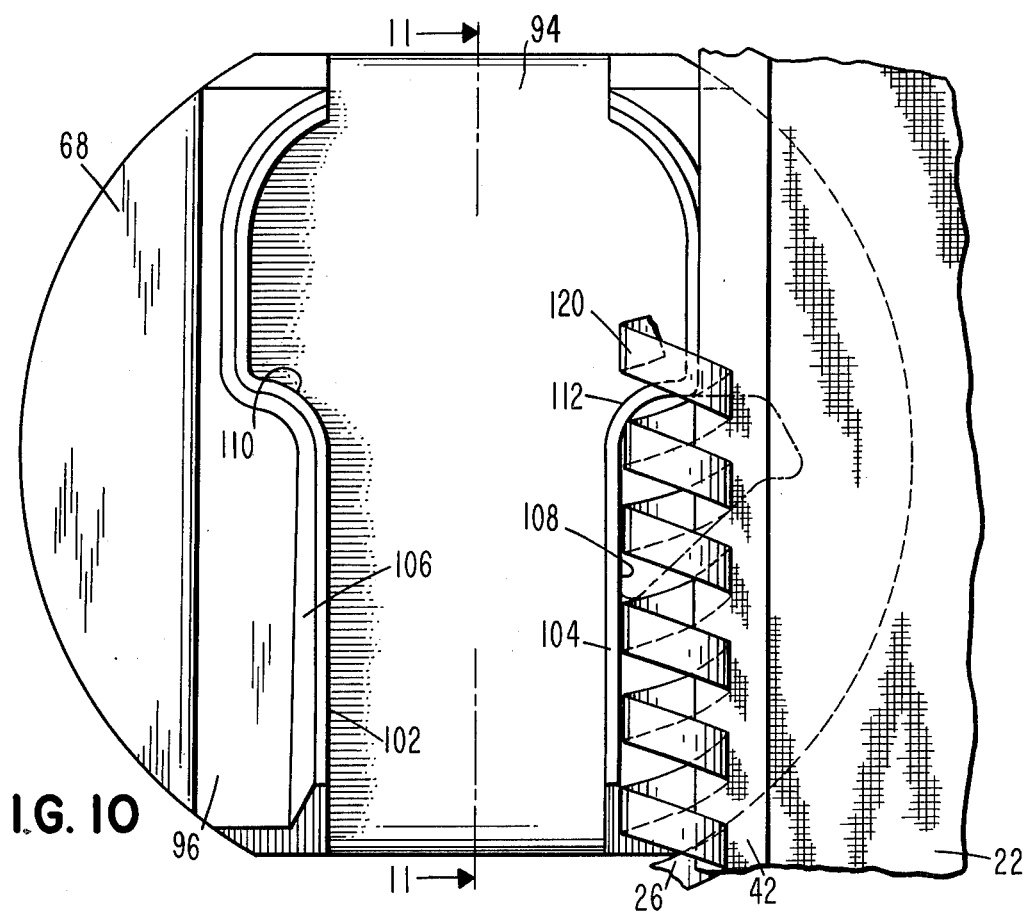
FIG. 10 is a bottom plan view of the horn tip of FIG. 9.
Figure 11:
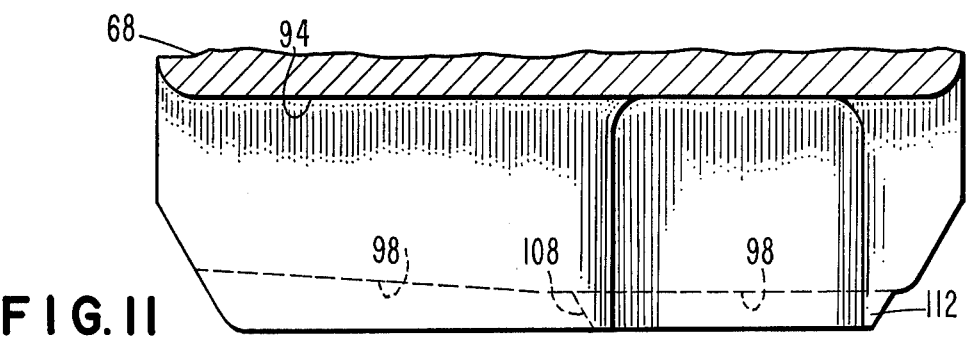
FIG. 11 is a cross-section view taken along line 11—11 in FIG. 10.

The horn tip 68, as illustrated in FIGS. 9, 10 and 11, has a slot 94 formed in the bottom thereof for receiving the chain separating portion 76 of the member 60. A pair of parallel channels 96 and 98 are formed in the bottom of the horn tip 68 on opposite sides of the slot 94. First sections of the channels 96 and 98, toward the bottom of FIG. 10, have widths corresponding to the width of the fastening elements 24 and beaded edge 40 and the fastening element 26 and beaded edge 42, respectively. Second sections of the channels 96 and 98, toward the top of FIG. 10, have reduced widths corresponding to the respective beaded edges 40 and 42, the second sections aligned with the outer portions of the first sections. The first sections of the channels 96 and 98 are designed to mate with the respective channels 80 and 81, FIG. 5, of the die and anvil member 60 and to extend over the respective die openings 72 and 74 for receiving and holding the fastening elements 24 and 26 and beaded edges 40 and 42 of the slide fastener. The second sections of the channels 96 and 98 are designed to mate with the channels 82 and 83 of the member 60 for receiving and guiding the beaded edges 40 and 42 of the slide fastener above the position where the top stops 32 and 34, FIG. 3, are to be attached.

Trimming edges 102 and 104 are formed on the horn tip 68 along and contiguous inside edges of the respective channels 96 and 98. The trimming edges 102 and 104 are suitably designed to cooperate with the upper surface 78 FIGS. 5 and 6, of the anvil and die member 60 contiguous the inner edges of the channels 80 and 82 and the channels 81 and 83 respectively to trim excess material and excess fastening element portions extending above the position of the top stops 32 and 34, FIG. 1. The sides 106 and 108 of the respective edges 102 and 104 bordering the channels 96 and 98 are beveled such as to aid in guiding the fastening elements 24 and 26 and the beaded edges 40 and 42 into the channels 80, 81, 82, 83, 96 and 98. Contours 110 and 112 of the respective trimming edges 102 and 104 are formed to produce suitable upper inside corners to the portion of the top stops 32 and 34 molded around the fastening elements at the back of the slide fastener.

The bottom surfaces of the channels 80 and 81 in the member 60 are formed at an incline downward, for example 3°, from openings 72 and 74 to the one edge of the member 60. Similarly the upper surfaces of the first sections of the channels 96 and 98 are formed at a slight incline upward, for example about 5°, from about the central point of the channels 96 and 98 to the edge of the horn tip 68.

In forming the top stops 32 and 34 by the apparatus of FIG. 4, the slide fastener is positioned on the upper surface 78 of the die and anvil member 60 with the front of the fastener down and with the chain separator portion 76 extending into the opening between the upper portion of the stringers to position the fastening elements 24 and 26 and the beaded edges 40 and 42 over or in the channels 80, 81, 82 and 83. At least one complete head portion at the top end of the fastening elements 24 and 26 is positioned over the die openings 72 and 74; portions of the top fastening elements or a few head portions may extend past the openings 72 and 74 as shown at 120 in FIG. 5. The ram device 66 advances the punches 62 and 64 upward severing blocks from the thermoplastic strip 88 by cooperation with the openings 72 and 74 in the die and anvil member 60. The punches 62 and 64 advance the severed blocks of thermoplastic material upward against the front surfaces of the the tapes 20 and 22 and fastening elements 24 and 26 of slide fastener. Simultaneously the ultrasonic mechanism 70 lowers the tip 68 against the bottom side of the slide fastener above the openings 72 and 74 and applies ultrasonic energy thereto. The ultrasonic energy causes the blocks of thermoplastic material to flow around the top fastening elements and to the front side of portions of the tape overlying the openings 72 and 74 to securely weld the top stops 32 and 34 to the respective tapes 20 and 22 and the fastening elements 24 and 26. Also the blocks of thermoplastic material flow into the cavity 90 forming the raised portions 48 of the top stops 32 and 34 with the edges 92 of the punches 62 and 64 forming the rabbets 46 of the top stops 32 and 34.

The trimming edges 102 and 104 cooperate with the upper anvil surface 78 of the die and anvil member 60 to trim any excess portions of the fastening elements such as shown at 120 in FIGS. 5 and 10 from the slide fastener. Thus the necessity of an extra step to trim the extra portions of the fastener element above the top stops 32 and 34 is eliminated.

The inclined bottom surfaces of the channels 80 and 81 and the inclined upper surfaces of the first sections of the channels 96 and 98 provide for more efficient application of ultrasonic energy to the thermoplastic blocks as well as resulting in less deformation of the fastening elements 24 and 26 proceeding down from the top stops 32 and 34.

Since many modifications, changes in detail, and variations may be made to the above-described embodiment, it is intended that all matter in the foregoing description and shown in the accompanying drawings be interpreted as illustrative and not in a limiting sense.

What is claimed is:

1. A pair of top stops for a slide fastener which has a pair of carrier tapes, interlocking fastening elements secured to inner edges of the tapes, and a slider with flanges and a divider forming a Y-shaped channel for opening and closing the interlocking fastening elements, each top stop comprising
    a body molded around the exposed head portion of at least one end fastening element on each respective tape and molded to one side of a portion of the respective tape,
    said body having a flange engaging portion extending over the respective tape in the path of movement of a respective one of the flanges and having an acute-angled bottom portion bounded by respective first and second substantially straight edges of the body,
    said first edge extending substantially in alignment with the inner edges of the head portions of the fastening elements on the respective tape, and
    said second edge extending from the bottom end of the body at an acute angle away from the first edge over the respective fastening elements and inner edge of the respective tape to the flange engaging portion such as to allow the bottom portion of the body to extend into the Y-shaped channel when the slide fastener is closed.

2. A pair of top stops as claimed in claim 1 wherein the divider of the slider has a tapered bottom end spaced above the top end of the flanges, and the top end of the first edge of each top stop is spaced relative to the flage engaging portion such that the top end of the first edge engages the tapered bottom end.

3. A pair of top stops as claimed in claim 1 wherein each body has a rabbet extending completely therearound to form a central portion raised from the rest of the body, the central portion having a rounded edge extending completely therearound.

4. A pair of stop stops as claimed in claim 1 wherein each body has a top edge, said top edge and said first and second edges forming a generally right-triangular configuration with the flange-engaging portion protruding therefrom, the first and top edge forming the right angle of the triangular configuration.

5. A pair of top stops as claimed in claim 4 wherein the acute angle between the first and second edges is sufficiently small to permit the bottom portions of the top stops to engage each other within the Y-shaped channel.

* * * * *